United States Patent [19]

Fox et al.

[11] Patent Number: 4,510,289
[45] Date of Patent: Apr. 9, 1985

[54] POLYCARBONATE/CONDENSATION POLYMER BLENDS

[75] Inventors: Daniel W. Fox, Pittsfield; Edward N. Peters, Lenox; Gary F. Smith, Pittsfield, all of Mass.

[73] Assignee: General Electric Company, Pittsfield, Mass.

[21] Appl. No.: 451,180

[22] Filed: Dec. 20, 1982

Related U.S. Application Data

[63] Continuation-in-part of Ser. No. 259,524, May 1, 1981, abandoned.

[51] Int. Cl.³ .............................................. C08L 69/00
[52] U.S. Cl. ...................................... 525/148; 525/422; 525/439; 525/463; 525/466; 525/469; 525/470; 525/906; 525/930
[58] Field of Search ............... 525/132, 439, 469, 466, 525/394, 905, 906, 470, 148, 422

[56] References Cited

U.S. PATENT DOCUMENTS

| | | | |
|---|---|---|---|
| 2,465,319 | 3/1949 | Whinfield et al. | 260/75 |
| 2,901,466 | 8/1959 | Kibler et al. | 260/75 |
| 2,999,835 | 9/1961 | Goldberg | 260/42 |
| 3,028,365 | 4/1962 | Schnell et al. | 260/47 |
| 3,047,539 | 7/1962 | Pengilly | 260/75 |
| 3,238,087 | 3/1966 | Norwalk et al. | 528/87 |
| 3,264,536 | 8/1966 | Robinson et al. | 528/128 |
| 3,277,051 | 10/1966 | Wynstra | 528/102 |
| 3,294,747 | 12/1966 | Fry | 528/95 |
| 3,305,528 | 2/1967 | Wynstra et al. | 528/95 |
| 3,334,154 | 8/1967 | Kim | 260/860 |
| 3,365,517 | 1/1968 | Barth | 525/906 |
| 3,720,732 | 3/1973 | Sevenich | 260/860 |
| 3,737,409 | 6/1973 | Fox | 260/49 |
| 3,766,146 | 10/1973 | Witsiepe | 260/75 R |
| 3,784,520 | 1/1974 | Hoeschele | 528/274 |
| 3,833,546 | 9/1974 | Takekoshi et al. | 528/28 |
| 3,852,242 | 12/1974 | White | 528/28 |
| 3,855,176 | 12/1974 | Skidmore | 525/113 |
| 3,917,643 | 11/1975 | Takekoshi et al. | 260/326 R |
| 3,956,229 | 5/1976 | Bollen et al. | 260/40 R |
| 3,966,842 | 6/1976 | Ludwig | 525/394 |
| 3,975,355 | 8/1976 | Bollen et al. | 260/40 R |
| 4,029,631 | 6/1977 | Bollen et al. | 260/40 R |
| 4,056,504 | 11/1977 | Grundmeier et al. | 260/37 PC |
| 4,107,251 | 8/1978 | Bollen et al. | 264/171 |
| 4,108,837 | 8/1978 | Johnson et al. | 528/128 |
| 4,172,103 | 10/1979 | Serini et al. | 525/76 |
| 4,188,314 | 2/1980 | Fox et al. | 260/37 PC |
| 4,286,075 | 8/1981 | Robeson et al. | 525/68 |
| 4,324,869 | 4/1982 | Robeson | 525/132 |

FOREIGN PATENT DOCUMENTS

| | | | |
|---|---|---|---|
| 0046558 | 3/1982 | European Pat. Off. | |
| 107052 | 10/1974 | Japan | 525/439 |
| 23125 | 2/1980 | Japan | 525/439 |
| 110153 | 8/1980 | Japan | 525/439 |

Primary Examiner—Theodore E. Pertilla
Attorney, Agent, or Firm—Hedman, Gibson, Costigan & Hoare

[57] ABSTRACT

A thermoplastic composition includes compatible blends of a mixed polycarbonate comprising units derived from a first dihydric phenol, which is a bis(hydroxyaryl) sulfone, a second dihydric phenol; and one or more thermoplastic condensation polymers containing hetero groups.

17 Claims, No Drawings

POLYCARBONATE/CONDENSATION POLYMER BLENDS

REFERENCE TO EARLIER FILED APPLICATION

This application is a continuation-in-part of pending patent application Ser. No. 259,524, filed May 1, 1981, now abandoned.

This invention relates to thermosplastic compositions containing a mixed polycarbonate and thermoplastic condensation polymers containing hetero groups which are admixed to provide compatible blends. More particularly, it relates to compositions comprising a mixed polycarbonate which comprises units derived from a first dihydric phenol which is a bis(hydroxyaryl)sulfone and a second dihydric phenol, and one or more thermoplastic polymers containing hetero groups to provide a compatible blend.

BACKGROUND OF THE INVENTION

At present, it is known to prepare a copolymer consisting of the reaction product of bis(3,5-dimethyl-4-hydroxyphenyl)sulfone; 2,2-bis(4-hydroxyphenyl)propane and a carbonate precursor. U.S. Pat. No. 3,737,409 describes a process for making such a copolymer, which is disclosed to lend itself to the preparation of textile fibers.

U.S. Pat. No. 4,286,057 describes a molding composition comprising blends of polyarylates derived from a dihydric phenol and mixtures of terephthalic acid and isophthalic acid, and at least one thermoplastic polymer compatible therewith. A blend of the polyarylates and an aromatic polycarbonate, where a thermoplastic compatible polymer is optionally added is also mentioned.

Polyethylene terephthalate films modified with a minor amount of preferably no more than 10% bisphenol A polycarbonate resin are disclosed in U.S. Pat. No. 3,720,732. Processing difficulties were encountered when higher amounts of the resin were included. In any event, when the working composition of the U.S. Pat. No. 3,720,732 patent are made, a compatible composition in the sense contemplated by the present invention is not obtained when the amount of polycarbonate resin exceeds as little as 5% by weight of the combined amounts of polycarbonate and polyester.

In applicants' concurrently filed copending application, Ser. No. 451,181, filed Dec. 20, 1982 there are disclosed and claimed novel compositions comprising mixed polycarbonates and thermoplastic addition polymers containing hetero groups which are admixed to provide compatible compositions.

SUMMARY OF THE INVENTION

Compatible mixtures of polycarbonates and thermoplastic resins have generally not been produced over a broad range of component proportions.

It is an object of this invention to provide blends of polycarbonate and thermoplastic condensation polymers which are compatible in mixtures having widely varying ratios of components and which have improved properties.

When used herein and in the appended claims, "compatible" refers to blends or compositions of polymers in which the component polymers do not undergo phase separation, thus helping to avoid stratification of the components during or after processing. Compatibility is of great significance for an admixture of different resins, because it ensures homogeneity, and a unity of properties, which greatly facilitates subsequent processing and use of the composition. Incompatible blends separate into phases containing predominantly their own separate components, and thus may be considered to be immiscible. This characteristic, combined with the often low physical attraction forces across the phase boundaries, usually causes immiscible/incompatible blend systems to have poor mechanical properties, thus preventing the preparation of useful polymer blends.

When blends of two polymers exhibit a single glass transition temperature (Tg), it generally signifies the resin components are compatible. However, a single Tg is not a necessary condition for a compatible blend.

In accordance with the present invention, there are provided thermoplastic compositions comprising a polycarbonate resin and a thermoplastic condensation polymer resin which have been melt admixed to provide a compatible composition.

Polycarbonates useful in accordance with the present invention are well known and any, especially the aromatic polycarbonates, may be employed. Intrinsic viscosities of from 0.40 to 0.80 dl./g (as measured in phenol/trichloroethylene) are preferred. Such resins may be formed from dihydric phenol, such as hydrocarbon bisphenol monomer, ordinarily by condensation with a carbonate precursor, such as carbonyl chloride, to provide a linear polymer consisting of units of the dihydric phenol linked to one another through carbonate linkages. The polycarbonate of the invention includes units derived from a dihydric phenol and a dihydric aryl sulfone.

In an especially preferred embodiment, a polycarbonate copolymer includes a diphenyl sulfone as described in U.S. Pat. No. 3,737,409 to Fox. For these copolymers a mole or unit ratio of 1:5 to 5:1 is desirable. The preferred diphenyl sulfone monomer for these resins is bis(3,5-dimethyl-4-hydroxyphenyl)sulfone, also known as dixylenol sulfone, which may be formed from 2,6-xylenol. The other preferred monomer is 2,2-bis(4-hydroxyphenyl)propane, also known as bisphenol A.

The condensation polymers which are mixed with the polycarbonate to form the compatible composition are comprised of units derived from repeat groups including a heterogroup. Heterogroups are groups containing atoms besides carbon and hydrogen; such atoms are designated heteroatoms.

The polymers containing heterogroups can have the heterogroups (A) as pendant groups on the polymer chain or as linkages in the polymer chain:

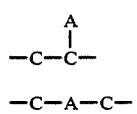

Typical examples of heteroatoms are oxygen, sulfur, nitrogen, halogen, etc. Examples of heterogroups are esters

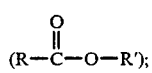

nitrile (R—CN); anhydride

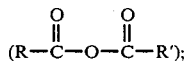

imide

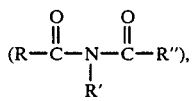

carbonate

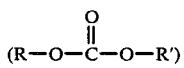

and the like. From the foregoing, it follows that polymers within the scope of this invention, without limitation, are illustrated by polyesters, polyamides, polyimides, polyethers, polysulfones, polycarbonates, polyacrylates, and the like. Outside the scope of the invention are polyolefins, poly(vinyl aromatics), and the like.

Once formed, the product composition may be employed (or further processed) in conventional manner. Its applications include, for example, tough films useful in packaging. It may also be injection molded or extruded to produce a variety of useful thermoplastic articles.

In addition to at least two polymeric components, the present compositions may contain any one of the conventional additives, for the purposes for which they are known. These additives include fire-retardants, impact modifiers, pigments, tints, reinforcing materials such as glass fiber, antioxidants and the like. They may be combined with the compositions either before or after melt mixing.

Condensation polymers suitable for admixing with the polycarbonate are selected from the group consisting of a copolyestercarbonate, a polyarylate, a poly(aryl ether), a copolyetherester block polymer, a polyhydroxyether, a polyimide, or combinations thereof.

(a) Polyesters

Polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeated units of the following general formula:

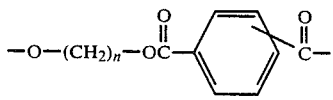
(I)

wherein n is an integer of from 2 to 4.

The preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

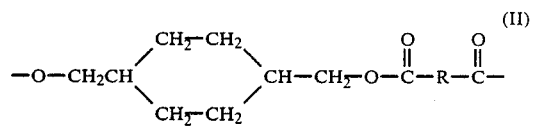
(II)

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R in formula II are isophthalic or terephthalic acid; 1,2-di(p-carboxyphenyl)ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

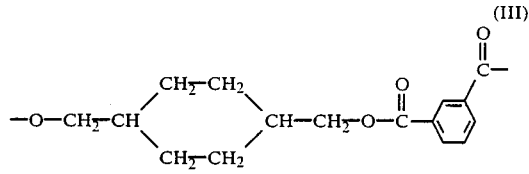
(III)

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

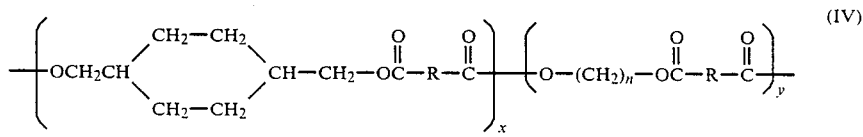
(IV)

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis-or trans-isomer (or mixtures thereof) of 1,4-cyclohexanedimethanol and ethylene glycol with terephthalic acid in a molar ratio of 1:2:3. These copolyesters have repeating units of the following formula:

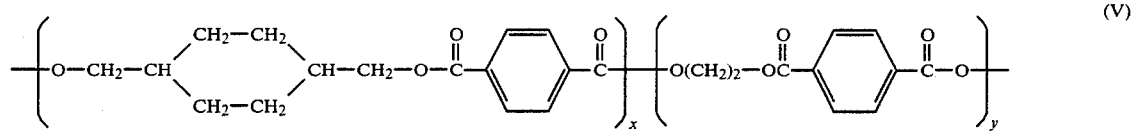

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23°–30° C.

(b) Aromatic Polycarbonate

Thermoplastic aromatic polycarbonates that can be employed as the thermoplastic heterogroup containing polymer herein are homopolymers and copolymers and mixtures thereof, which have an intrinsic viscosity of from about 0.4 to about 1.0 dl/g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2(3,5,3′,5′-tetrabromo-4,4′-dihydroxydiphenyl)propane, (3,3′-dichloro-4,4′-dihydroxydiphenyl)methane, and the like. Other dihydric phenols of the bisphenol type are described in, for Example, U.S. Pat. Nos. 2,999,835, 3,028,365 and 3,334,154.

It is, of course, possible to employ two or more different dihydric phenols, or a copolymer of a dihydric phenol, with a glycol or with hydroxy or acid terminated polyesters, or with a dibasic acid, in the event a carbonate copolymer or inter-polymer rather than a homopolymer is desired for use in the preparation of the aromatic carbonate polymer containing heterogroup.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di-(tolyl)carbonate, di-(naphthyl)carbonate, di-(chloronaphthyl)carbonate, etc. or mixtures thereof. The haloformates suitable for use herein include bishaloformates of dihydric phenols, for example: bischloroformates of bisphenol-A, of hydroquinone, etc.; of glycols, for example: bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art, by using phosgene or haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylanaline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in one-phase (homogeneous solution) or two-phase (interfacial) systems when phosgene or a haloformate are used. Bulk reactions are possible when the diarylcarbonate precursors are used.

(c) Poly(arylether)s

Poly(aryl ether) resin components suitable for use herein are linear, thermoplastic polyarylene polyether polysulfones, wherein the arylene units are interspersed with ether and sulfone linkages. These resins may be obtained by reaction of an alkali metal double salt of a dihydric phenol and a dihalobenzenoid compound, either or both of which contain a sulfone or ketone linkage i.e., —SO$_2$— or —CO— between arylene groupings, to provide sulfone or ketone units in the polymer chain in addition to arylene units and ether units. The polysulfone polymer has a basic structure comprising recurring units of the formula:

—O—E—O—E′— wherein E is the residuum of the dihydric phenol and E′ is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S. Pat. Nos. 3,264,536 and 4,108,837, for example.

The residuum of a dihydric phenol, E, is derived from dinuclear phenols having the structure:

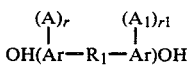

wherein Ar is an aromatic group and preferably is a phenylene group, A and $A_1$ may be the same or different inert substituent groups, such as alkyl groups having from 1 to 4 carbon atoms, halogen atoms, i.e., fluorine, chlorine, bromine or iodine or alkoxy radicals having from 1 to 4 carbon atoms, r and $r_1$ are integers having a value of from 0 to 4, inclusive, and $R_1$ is representative of a bond between aromatic carbon atoms as in dihydroxydiphenyl, or is a divalent radical, including, for example, CO, O, S, S—S, $SO_2$ or a divalent organic hydrocarbon radical, such as alkylene, alkylidene, cycloalkylene, or the halogen, alkyl, aryl, aryl, or like substituted alkylene, alkylidene and cycloalkylene radicals as well as alkarylene and aromatic radicals and a ring fused to both Ar groups.

Typical preferred polymers have recurring units having the following structure:

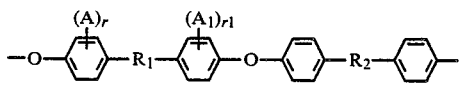

as described in U.S. Pat. No. 4,108,837, supra. In the foregoing formula A and $A_1$ can be the same or different inert substituent groups such as alkyl groups having from 1 to 4 carbon atoms, halogen atoms (e.g., fluorine, chlorine, bromine or iodine) or alkoxy radicals having from 1 to 4 carbon atoms, r and r1 are integers having a value of from 0 to 4, inclusive. Typically, $R_1$ is representative of a bond between aromatic carbon atoms or a divalent connecting radical and $R_2$ represents sulfone, carbonyl, or sulfoxide. Preferably, $R_1$ represents a bond between aromatic carbon atoms. Even more preferred are the thermoplastic polysulfones of the above formula wherein r and r1 are zero, $R_1$ is a divalent connection radical of the formula:

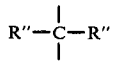

wherein R″ is selected from lower alkyl, aryl, and the halogen substituted groups thereof, preferably methyl, and $R_2$ is a sulfone group.

The poly(aryl ether)s have a reduced viscosity of from about 0.4 to about 1.5 dl/g as measured in an appropriate solvent at an appropriate temperature depending on the particular polyether, such as in methylene chloride at 25° C.

The preferred poly(aryl ether)s have repeating units of the formula:

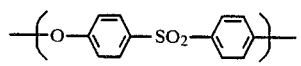

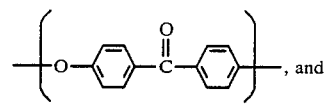, and

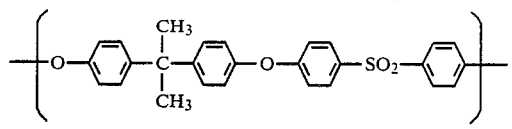

(d) Copolyetherester Block Copolymer

Copolyetheresters suitable for use herein are well known in the art and are described in, for example, U.S. Pat. Nos. 3,784,520 and 3,766,146.

The polyester comprises a multiplicity of recurring intralinear along chain and short chain ester units connected head-to-tail through ester linkages, said long chain ester units being represented by the following structure:

 (a)

and said short chain ester units being represented by the following structure:

 (b)

wherein G is a divalent radical remaining after removal of terminal hydroxy groups from a poly(alkylene oxide)glycol having a molecular weight of from about 400 to about 3500; D is a divalent radical remaining after removal of hydroxyl groups from a low molecular weight diol having a molecular weight of less than about 250; and $R_3$ is a divalent radical remaining after removal of carboxyl groups from a dicarboxylic acid having a molecular weight of less than about 300, with the proviso that the short chain ester units constitute from about 25 to about 65% by weight of the copolyester, at least about 70% of the $R_3$ groups are 1,4-phenylene radicals, at least about 70% of the D groups are 1,4-butylene radicals, and the sum of the percentages of the $R_3$ groups which are not 1,4-phenylene radicals and the D groups which are not 1,4-butylene radicals does not exceed about 30%.

The term "long chain ester units" as applied to units in a polymer chain refers to the reaction product of a long chain glycol with a diacarboxylic acid. Such "long chain ester units," which are repeating units in the copolyester herein, correspond to the structure (a) above. The long chain glycols may be poly(alkylene oxide)glycols having a molecular weight between about 400 and about 3500, preferably between about 600 and about 2000. Copolyesters prepared from poly(alkylene oxide)glycols having a molecular weight between about 600 to about 2000 are preferred.

The term "short chain ester units" as applied to units in a polymer chain refers to low molecular weight compounds or polymer chain units having molecular weight of less than about 550. They are made by reacting a low molecular weight diol, (below about 250), with a dicarboxylic acid, to form ester units represented by structure (b) above.

Included among the low molecular weight diols, (other than 1,4-butanediol), which react to form short chain ester units are acyclic, alicyclic and aromatic dihydroxy compounds. Preferred are diols with from 2 to 15 carbon atoms, such as ethylene, propylene, isobutylene, tetramethylene, pentamethylene, 2,2-dimethyltrimethylene, hexamethylene and decamethylene glycols, dihydroxy cyclohexane, cyclohexanedimethanol, resorcinol, hydroquinone, 1,5-dihydroxy naphthalene, etc. Especially preferred are aliphatic diols containing from 2 to 8 carbon atoms. Included among the bisphenols which can be used as bis(p-hydroxy)diphenyl, bis(p-hydroxyphenyl)methane, and bis(p-hydroxyphenyl)propane.

Dicarboxylic acids (other than terephthalic acid) which are reacted with the foregoing long chain glycols or low molecular weight diols to produce the copolyesters are aliphatic, cycloaliphatic or aromatic dicarboxylic acids.

Representative aliphatic and cycloaliphatic acids which may be used are sebacic acid, 1,3-cyclohexane dicarboxylic acid, 1,4-cyclohexane dicarboxylic acid, adipic acid, glutaric acid, succinic acid, carbonic acid, cyclopentanedicarboxylic acid, decahydro-1,5-naphthylene dicarboxylic acid and 4,4-bicyclohexyl dicarboxylic acid. Preferred aliphatic acids are cyclohexane-dicarboxylic acids.

Representative aromatic dicarboxylic acids which may be used include phthalic, terephthalic and isophthalic acids, substituted dicarboxy compounds with two benzene nuclei, such as bis(p-carboxyphenyl)methane and p-carboxyphenyl/oxybenzoic acid. Among the aromatic acids, those with from 8 to 16 carbon atoms are preferred, particularly the phenylene dicarboxylic acids, i.e., terephthalic and isophthalic acids.

Preferably, at least about 70 mole percent of the dicarboxylic acid incorporated into the polymer is terephthalic acid and at least about 70 mole percent of the low molecular weight diol incorporated into the polymer is 1,4-butanediol. Thus, at least 70% of the $R_3$ groups in structures (a) and (b) above are 1,4-phenylene radicals and at least about 70% of the D groups in formula b above are 1,4-butylene radicals.

The most preferred copolyesters are those prepared from dimethylterephthalate, 1,4-butanediol and poly(tetramethylene oxide) glycol having a molecular weight of from about 600 to about 1500.

The copolyetheresters described herein can be made conveniently by a conventional ester interchange reaction by methods well known in the art and as described in, for example, U.S. Pat. Nos. 3,784,520 and 3,766,146.

(e) Polyhydroxyether

The thermoplastic polyhydroxyethers which may be used herein have the following general formula:

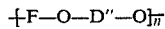

where F is the radical residuum of a dihydric phenol, D" is a radical residuum of an epoxide selected from mono- and diepoxides and which contain from 1 to 2 hydroxyl groups, and n is an integer which represents the degree of polymerization and is at least about 30 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

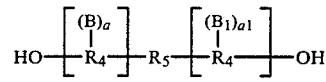

wherein $R_4$ is an aromatic divalent hydrocarbon radical, such as naphthylene and phenylene, with phenylene being preferred; B and $B_1$ may be the same or different and are selected from alkyl radicals, such as methyl, n-propyl, n-butyl, n-hexyl, n-octyl and the like, preferably alkyl radicals having 1 to 4 carbon atoms; a and a1 are independently integers of 0 to 4, and R' is alkylene, alkylidene cycloalkylene or a saturated divalent group. Particularly preferred are dihydric polynuclear phenols having the general formula:

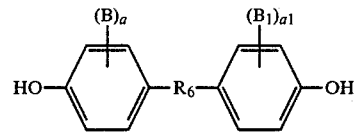

wherein B, $B_1$ a and a1 are as previously defined, and $R_6$ is an alkylene or alkylidene group, preferably having from 1 to 3 carbon atoms, or cycloalkylene having 6 to 12 carbon atoms.

Diepoxides useful for the preparation of polyhydroxyethers may be represented by repeating units of the following formula:

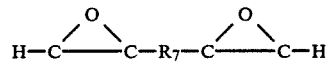

wherein $R_7$ is representative of a bond between adjacent carbon atoms or a divalent organic radical such as an aliphatic, aromatic, cyclic, heterocyclic or acyclic arrangement of atoms.

Other diepoxides which can be mentioned include those wherein two oxirane groups are linked through an aromatic ether, i.e., compounds having the grouping

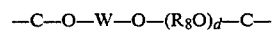

wherein $R_8$ is a divalent organic radical, W is a divalent aromatic radical residuum of a dihydric phenol, such as those listed above in the description of dihydric phenols, and d is an integer from 0 to 1 inclusive.

Still other diepoxides include ethers wherein the oxirane groups are connected to vicinal carbon atoms, at least one pair of which is a part of a cycloaliphatic hydrocarbon.

These polyhydroxy ethers are prepared by methods well known in the art, such as those described in, for example, U.S. Pat. Nos. 3,238,087; 3,305,528; 3,294,747; and 3,277,051.

(f) Polyimides

Polyimides prepared from the reaction between substantially equal molar amounts of aromatic bis(ether anhydride)s of the formula,

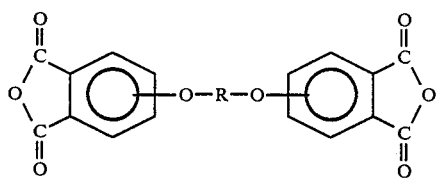 (I)

and organic diamine of the formula,

 (II)

in the presence of a phenolic solvent which produces a solution which remains homogeneous when the mixture is allowed to cool to room temperature. There is obtained a solution of polyimide in the phenolic solvent which can be used directly as a wire coating enamel or for applying polyimide onto various substrates. If desired, the polyimide can be recovered by effecting its separation from the phenolic solvent mixture with a non-solvent for polyimide, such as methanol.

As shown in formula I, R is a member selected from the class consisting of (a) the following divalent organic radicals:

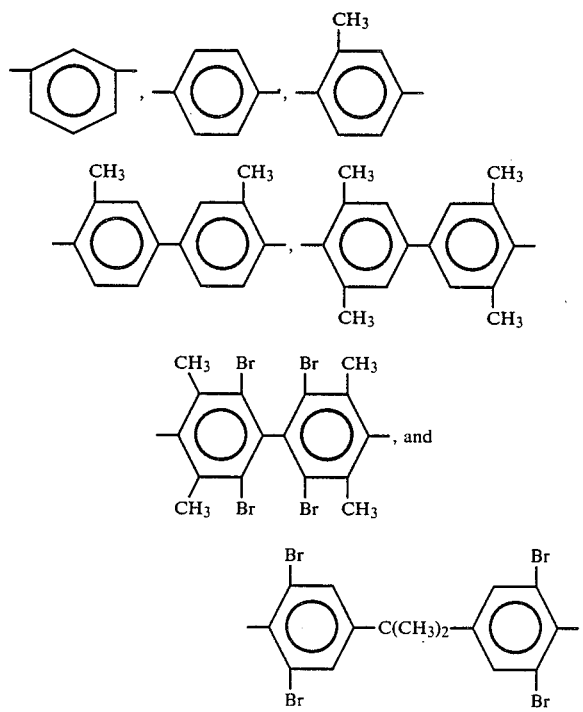

and (b) divalent organic radicals of the general formula

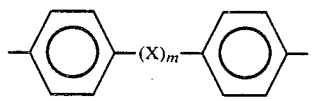

where X is a member selected from the class consisting of divalent radicals of the formulas

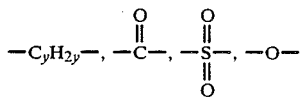

and —S—, where m is 0 or 1, y is a whole number from 1 to 5, and $R^1$ is a divalent organo radical selected from the class consisting of (a) aromatic hydrocarbon radicals having from 6-20 carbon atoms and halogenated derivatives thereof, (b) alkylene radicals, $C_{(2-8)}$ alkylene terminated polydiorganosiloxane, cycloalkylene radicals having from 2-20 carbon atoms, and (c) divalent radicals included by the formula,

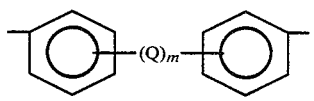

where Q is a member selected from the class consisting of

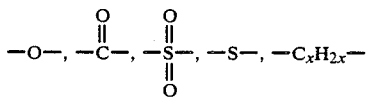

and x is a whole number from 1 to 5 inclusive, and m is as previously defined.

These polyimide are prepared by methods well known in the art such as those described in, for example, U.S. Pat. Nos. 3,917,643; 3,852,242; 3,855,176; and 3,833,546.

The following examples are given by way of illustration only and are not intended as a limitation of the scope of this invention. Many variations are possible without departing from its spirit and scope. Unless otherwise specified herein, all proportions are provided on a weight basis. The intrinsic viscosities (I.V.) are all determined in a solvent mixture comprising 60-40 w/w phenol-tetrachloroethene at 30° C.

EXAMPLE 1

A resin blend is provided by admixing poly(ethylene terephthalate) resin with 45 percent by total resin weight of polycarbonate resin formed from dixylenol sulfone (sulfone) and bisphenol A (bisphenol) in a mole ratio of 1:4.

This admixture is melt mixed at a temperature of about 325° C. for 30 minutes in a Brabender mixing bowl to form a melt admixed composition. Comparative properties of the resins and the melt admixed composition are as follows:

| Polycarbonate | Poly(ethylene terephthalate) | Composition |
| --- | --- | --- |
| I.V. = 0.61 | I.V. = 0.72 | I.V. = 0.52 |
| Tg = 172° C. | Tg = 67° C. (amorphous) | Tg = 108° C. |

The resolution of the distinct glass transition points of the two component resins to the single point for the melt admixed composition shows formation of a homogeneous resin solution.

EXAMPLE 2

The process of Example 1 is repeated substituting 50 percent by weight of a polycarbonate having a 1:1 mole ratio of sulfone to bisphenol. Comparative properties after melt admixture at about 325° C. for 5 minutes are as follows:

| Polycarbonate | Poly(ethylene terephthalate) | Composition |
|---|---|---|
| I.V. = 0.48 | I.V. = 0.72 | I.V. = 0.46 |
| Tg = 202° C. | Tg = 67° C. (amorphous) | Tg = 120° C. |

EXAMPLE 3

The process of Example 1 is repeated substituting 45 percent by weight of polycarbonate having a 3:1 mole ratio of sulfone to bisphenol. Comparative properties after melt admixture at about 325° C. for 10 minutes are as follows:

| Polycarbonate | Poly(ethylene terephthalate) | Composition |
|---|---|---|
| I.V. = 0.58 | I.V. = 0.72 | I.V. = 0.48 |
| Tg = 227° C. | Tg = 67° C. (amorphous) | Tg = 117° C. |

EXAMPLE 4

A poly(ethylene terephthalate) is admixed with 50 percent by total weight of polycarbonate resin formed from sulfone and bisphenol A in a mole ratio of 1:1.

This admixture is melt mixed at a temperature of about 270° C. for 3–5 minutes in an 1-inch single screw extruder. Comparative properties of the resultant composition are as follows:

| Polycarbonate | Poly(ethylene terephthalate) | Composition |
|---|---|---|
| I.V. = 0.58 | I.V. = 0.72 | I.V. = 0.54 |
| Tg = 202° C. | Tg = 67° C. (amorphous) | Tg = 103° C. |

EXAMPLE 5

The process of Example 4 is repeated substituting 40 percent by weight of a polycarbonate having 1:1 mole ratio of sulfone to bisphenol. Comparative properties after extruding are as follows:

| Polycarbonate | Poly(ethylene terephthalate) | Composition |
|---|---|---|
| I.V. = 0.58 | I.V. = 0.72 | I.V. = 0.60 |
| Tg = 202° C. | Tg = 67° C. (amorphous) | Tg = 97° C. |

EXAMPLE 6

The process of Example 4 is repeated substituting 90 percent by weight of a polycarbonate having a 1:1 mole ratio of sulfone to bisphenol. Comparative properties after extruding are as follows:

| Polycarbonate | Poly(ethylene terephthalate) | Composition |
|---|---|---|
| I.V. = 0.45 | I.V. = 0.72 | I.V. = 0.41 |
| Tg = 197° C. | Tg = 67° C. (amorphous) | Tg = 169° C. |

EXAMPLE 7

The process of Example 1 is repeated substituting 80 percent by weight of polycarbonate having a 4:1 mole ratio of sulfone to bisphenol. Comparative properties after melt admixture at about 335° C. for 5 minutes are as follows:

| Polycarbonate | Poly(ethylene terephthalate) | Composition |
|---|---|---|
| I.V. = 0.68 | I.V. = 0.72 | I.V. = 0.65 |
| Tg = 235° C. | Tg = 67° C. (amorphous) | Tg = 192° C. |

EXAMPLE 8

The process of Example 1 is repeated substituting 80 percent by weight of polycarbonate having a 1:1 mole ratio of sulfone to bisphenol. Comparative properties after melt admixture at about 300° C. for 5 minutes are as follows:

| Polycarbonate | Poly(ethylene terephthalate) | Composition |
|---|---|---|
| I.V. = 0.73 | I.V. = 0.72 | I.V. = 0.68 |
| Tg = 210° C. | Tg = 67° C. (amorphous) | Tg = 180° C. |

EXAMPLE 9

The process of Example 1 is repeated substituting 80 percent by weight of polycarbonate having a 3:7 mole ratio of sulfone to bisphenol. Comparative properties after melt admixture at about 280° C. for 5 minutes are as follows:

| Polycarbonate | Poly(ethylene terephthalate) | Composition |
|---|---|---|
| I.V. = 0.62 | I.V. = 0.72 | I.V. = 0.61 |
| Tg = 171° C. | Tg = 67° C. (amorphous) | Tg = 138° C. |

EXAMPLE 10

The process of Example 1 is repeated substituting 60 percent by weight of polycarbonate having a 4:1 mole ratio of sulfone to bisphenol. Comparative properties after melt admixture at about 325° C. for 5 minutes are as follows:

| Polycarbonate | Poly(ethylene terephthalate) | Composition |
|---|---|---|
| I.V. = 0.68 | I.V. = 0.72 | I.V. = 0.63 |
| Tg = 235° C. | Tg = 67° C. (amorphous) | Tg = 147° C. |

EXAMPLE 11

The process of Example 1 is repeated substituting 60 percent by weight of polycarbonate having a 1:1 mole ratio of sulfone to bisphenol. Comparative properties after melt admixture at about 300° C. for 5 minutes are as follows:

| Polycarbonate | Poly(ethylene terephthalate) | Composition |
|---|---|---|
| I.V. = 0.73 | I.V. = 0.72 | I.V. = 0.68 |
| Tg = 210° C. | Tg = 67° C. (amorphous) | Tg = 135° C. |

EXAMPLE 12

The process of Example 1 is repeated substituting 60 percent by weight of polycarbonate having a 3:7 mole ratio of sulfone to bisphenol. Comparative properties after melt admixture at about 275° C. for 5 minutes are as follows:

| Polycarbonate | Poly(ethylene terephthalate) | Composition |
|---|---|---|
| I.V. = 0.62 | I.V. = 0.72 | I.V. = 0.64 |
| Tg = 171° C. | Tg = 67° C. (amorphous) | Tg = 99° C. |

EXAMPLE 13

The process of Example 1 is repeated substituting 40 percent by weight of polycarbonate having a 4:1 mole ratio of sulfone to bisphenol. Comparative properties after melt admixture at about 310° C. for 5 minutes are as follows:

| Polycarbonate | Poly(ethylene terephthalate) | Composition |
|---|---|---|
| I.V. = 0.68 | I.V. = 0.72 | I.V. = 0.66 |
| Tg = 235° C. | Tg = 67° C. (amorphous) | Tg = 112° C. |

EXAMPLE 14

The process of Example 1 is repeated substituting 40 percent by weight of polycarbonate having a 1:1 mole ratio of sulfone to bisphenol. Comparative properties after melt admixture at about 285° C. for 5 minutes are as follows:

| Polycarbonate | Poly(ethylene terephthalate) | Composition |
|---|---|---|
| I.V. = 0.73 | I.V. = 0.72 | I.V. = 0.70 |
| Tg = 210° C. | Tg = 67° C. (amorphous) | Tg = 105° C. |

EXAMPLE 15

The process of Example 1 is repeated substituting 40 percent by weight of polycarbonate having a 3:7 mole ratio of sulfone to bisphenol. Comparative properties after melt admixture at about 270° C. for 5 minutes are as follows:

| Polycarbonate | Poly(ethylene terephthalate) | Composition |
|---|---|---|
| I.V. = 0.62 | I.V. = 0.72 | I.V. = 0.66 |
| Tg = 171° C. | Tg = 67° C. (amorphous) | Tg = 90° C. |

EXAMPLE 16

The process of Example 1 is repeated substituting 20 percent by weight of polycarbonate having a 4:1 mole ratio of sulfone to bisphenol. Comparative properties after melt admixture at about 310° C. for 5 minutes are as follows:

| Polycarbonate | Poly(ethylene terephthalate) | Composition |
|---|---|---|
| I.V. = 0.68 | I.V. = 0.72 | I.V. = 0.67 |
| Tg = 235° C. | Tg = 67° C. (amorphous) | Tg = 85° C. |

EXAMPLE 17

The process of Example 1 is repeated substituting 20 percent by weight of polycarbonate having a 1:1 mole ratio of sulfone to bisphenol. Comparative properties after melt admixture at about 275° C. for 5 minutes are as follows:

| Polycarbonate | Poly(ethylene terephthalate) | Composition |
|---|---|---|
| I.V. = 0.73 | I.V. = 0.72 | I.V. = 0.65 |
| Tg = 210° C. | Tg = 67° C. (amorphous) | Tg = 83° C. |

EXAMPLE 18

The process of Example 1 is repeated substituting 20 percent by weight of polycarbonate having a 3:7 mole ratio of sulfone to bisphenol. Comparative properties after melt admixture at about 270° C. for 5 minutes are as follows:

| Polycarbonate | Poly(ethylene terephthalate) | Composition |
|---|---|---|
| I.V. = 0.62 | I.V. = 0.72 | I.V. = 0.63 |
| Tg = 171° C. | Tg = 67° C. (amorphous) | Tg = 82° C. |

EXAMPLE 19

The procedure of Example 1 is repeated substituting 50 percent by weight of polycarbonate having a 1:1 mole ratio of sulfone to bisphenol and 50 percent by weight poly(butylene terephthalate). Comparative properties after melt admixture at about 300° C. are as follows:

| Polycarbonate | Poly(butylene terephthalate) | Composition |
|---|---|---|
| I.V. = 0.62 | I.V. = 1.02 | I.V. = 0.73 |
| Tg = 210° C. | Tg = 45° C. | Tg = 102° C. |

EXAMPLE 20

The procedure of Example 1 is repeated substituting 50 percent by weight of polycarbonate having a 4:1 mole ratio of sulfone to bisphenol and 50 percent by weight poly(butylene terephthalate). The results after melt admixture at about 310° C. are as follows:

| Polycarbonate | Poly(butylene terephthalate) | Composition |
|---|---|---|
| I.V. = 0.65 | I.V. = 1.02 | I.V. = 0.75 |
| Tg = 235° C. | Tg = 45° C. | Tg = 112° C. |

EXAMPLE 21

The procedure of Example 1 is repeated substituting 50 percent by weight of polycarbonate having a 3:7 mole ratio of sulfone to bisphenol and 50 percent by weight of 1 poly(butylene terephthalate). The results after melt admixture at about 290° C. are as follows:

| Polycarbonate | Poly(butylene terephthalate) | Composition |
|---|---|---|
| I.V. = 0.73 | I.V. = 1.02 | I.V. = 0.84 |
| Tg = 171° C. | Tg = 45° C. | Tg = 97° C. |

EXAMPLE 22

A physical mixture of 50 percent by weight of dry polycarbonate having a 1:1 mole ratio of sulfone to bisphenol and 50 percent by weight poly(butylene terephthalate) (manufactured by General Electric Company under the trademark Valox 310) are melt mixed in an extruder operating under the following conditions:

| RPM | Temperature | | | Die Melt | Amp |
| --- | --- | --- | --- | --- | --- |
| | Zone 1 | Zone 2 | Zone 3 | | |
| 30 | 530° F. | 565° F. | 565° F. | 540° F. | 3.0 |

The extruded, blended polymer strands are chopped into pellets which are dried and injection-molded (into specimens suitable for testing) in a 3 ounce/75 ton Newbury injection molding machine operating under the following conditions:

| Barrel Temperature | 530° F. |
| --- | --- |
| Mold Temperature | 150° F. |
| Molding Pressure | 10,000 psi |

The specimens were evaluated for flexural properties (ASTM D790) and heat distortion temperature (ASTM D256). Comparative data is presented in Table I.

TABLE I

| | Flexural Modulus (psi) | Flexural Strength (psi) | Heat Distortion Temperature (°C.) |
| --- | --- | --- | --- |
| Valox 310 poly(butylene terephthalate) | 340,000 | 12,800 | 54 |
| Specimen | 381,000 | 14,300 | 73 |

EXAMPLE 23

A physical mixture of 50 percent by weight of dry polycarbonate having a 1:1 mole ratio of sulfone to bisphenol and 50 percent by weight of a copolyester derived from ethylene glycol, cyclohexane dimethanol and terephthalic acid (manufactured by Eastman Kodak Co. under the trademark Kodar PETG) is extruder blended, and injection molded, and tested for properties substantially as described in Example 22. Comparative results are as follows:

| Property | Specimens | Kodar PETG Copolyester |
| --- | --- | --- |
| Tg, °C. | 131 | 80 |
| HDT, °C. | 106 | 65 |
| Notched Izod, ft-lb/in | 0.8 | 0.8–1.9 |
| Flex. Mod., psi | 370,000 | 308,000 |
| Flex. Str., psi | 17,100 | 11,400 |

EXAMPLE 24

A physical mixture of 50 percent by weight of dry polycarbonate having a 1:1 mole ratio of sulfone to bisphenol and 50 percent by weight of a copolyester derived from cyclohexane dimethanol and iso/terephthalic acids (manufactured by Eastman Kodak Company under the trademark Kodar A-150) is extruder blended, injection molded, and tested for properties substantially as described in Example 22. Comparative results are as follows:

| Property | Specimens | Kodar A-150 Copolyester |
| --- | --- | --- |
| Tg, °C. | 137 | 87 |
| HDT, °C. | 114 | 71 |
| Notched Izod, Ft-lb/in | 1.1 | 1.4 |
| Flex. Mod., psi | 330,000 | 241,000 |
| Flex. Str., psi | 15,600 | 9,800 |

EXAMPLE 25

The process of Example 1 is repeated substituting 60 percent by weight of polycarbonate having a 1:1 mole ratio of sulfone to bisphenol and 40 percent by weight of Bisphenol A polycarbonate (manufactured by General Electric Company under the trademark Lexan). Comparative results after melt admixture at about 300° C. are as follows:

| Sulfone/Bisphenol Polycarbonate | Lexan Polycarbonate | Composition |
| --- | --- | --- |
| Tg = 210° C. | 150° C. | 172° C. |

EXAMPLE 26

The procedure of Example 1 is repeated substituting 60 percent by weight polycarbonate having a 3:7 mole ratio of sulfone to bisphenol and 40 percent by weight of Lexan polycarbonate. Comparative results after melt admixture at about 300° C. are as follows:

| Sulfone/Bisphenol Polycarbonate | Lexan Polycarbonate | Composition |
| --- | --- | --- |
| Tg = 171° C. | 150° C. | 162° C. |

EXAMPLE 27

The procedure of Example 1 is repeated substituting 40 percent by weight of polycarbonate having a 1:1 mole ratio of sulfone to bisphenol and 60 percent by weight of Lexan polycarbonate. Comparative results after melt admixture at about 300° C. are as follows:

| Sulfone/Bisphenol Polycarbonate | Lexan Polycarbonate | Composition |
| --- | --- | --- |
| Tg = 210° C. | 150° C. | 168° C. |

EXAMPLE 28

The procedure of Example 1 is repeated substituting 40 percent by weight of polycarbonate having a 3:7 mole ratio of sulfone to bisphenol and 60 percent by weight of Lexan polycarbonate. Comparative results after melt admixture at about 300° C. are as follows:

| Sulfone/Bisphenol Polycarbonate | Lexan Polycarbonate | Composition |
| --- | --- | --- |
| Tg = 171° C. | 150° C. | 159° C. |

EXAMPLE 29

The procedure of Example 1 is repeated substituting 20 percent by weight of polycarbonate having a 1:1 mole ratio of sulfone to bisphenol and 80 percent by weight of Lexan polycarbonate. Comparative results after melt admixture at about 300° C. are as follows:

| Sulfone/Bisphenol Polycarbonate | Lexan Polycarbonate | Composition |
|---|---|---|
| Tg = 210° C. | 150° C. | 155° C. |

EXAMPLE 30

The procedure of Example 1 is repeated substituting 20 percent by weight of polycarbonate having a 3:7 mole ratio of sulfone to bisphenol and 80 percent by weight of Lexan polycarbonate. Comparative results after melt admixture at about 300° C. are as follows:

| Sulfone/Bisphenol Polycarbonate | Lexan Polycarbonate | Composition |
|---|---|---|
| Tg = 171° C. | 150° C. | 154° C. |

EXAMPLE 31

The procedure of Example 1 is repeated substituting 90 percent by weight of polycarbonate having a 1:1 mole ratio of sulfone to bisphenol and 10 percent by weight Lexan polycarbonate. Comparative results after melt admixture at about 310° C. are as follows:

| Sulfone/Bisphenol Polycarbonate | Lexan Polycarbonate | Composition |
|---|---|---|
| Tg = 210° C. | 150° C. | 193° C. |

EXAMPLE 32

The procedure of Example 1 is repeated substituting 70 percent by weight of polycarbonate having a 1:1 mole ratio of sulfone to bisphenol and 30 percent by weight of Lexan polycarbonate. Comparative results after melt admixture at about 310° C. are as follows:

| Sulfone/Bisphenol Polycarbonate | Lexan Polycarbonate | Composition |
|---|---|---|
| Tg = 210° C. | 150° C. | 187° C. |

EXAMPLE 33

The procedure of Example 1 is repeated substituting 55 percent by weight of polycarbonate having a 1:1 mole ratio of sulfone to bisphenol and 45 percent by weight of Lexan polycarbonate. Comparative results after melt admixture at about 300° C. are as follows:

| Sulfone/Bisphenol Polycarbonate | Lexan Polycarbonate | Composition |
|---|---|---|
| Tg = 210° C. | 150° C. | 177° C. |

EXAMPLE 34

A physical mixture of 5 percent by weight of dry polycarbonate having a 1:1 mole ratio of sulfone to bisphenol and 95 percent by weight Lexan polycarbonate are extruder blended, injection molded, and tested for properties substantially as described in Example 22. The results of this Example are presented in Table II below.

EXAMPLE 35

A physical mixture of 10 percent by weight of dry polycarbonate having a 1:1 mole ratio of sulfone to bisphenol and 90 percent by weight of Lexan polycarbonate are extruder blended, injection molded, and tested for properties substantially as described in Example 22. The results of this Example are presented in Table II below.

EXAMPLE 36

A physical mixture of 15 percent by weight of dry polycarbonate having a 1:1 mole ratio of sulfone to bisphenol and 85 percent by weight Lexan polycarbonate are extruder blended, injection molded, and tested for properties substantially as described in Example 22. The results of this Example are presented in Table II below.

EXAMPLE 37

A physical mixture of 20 parts of dry polycarbonate having a 1:1 mole ratio of sulfone to bisphenol and 80 parts Lexan polycarbonate are extruder blended, injection molded, and tested for properties substantially as described in Example 22. The results of this Example are presented in Table II below.

TABLE II

| | Tg °C. | HDT °C. | Notched Izod ft lbs/in |
|---|---|---|---|
| Lexan Polycarbonate | 151 | 140 | >15 |
| Example 34 | 153 | 143 | >15 |
| Example 35 | 155 | 147 | >15 |
| Example 36 | 157 | 149 | >15 |
| Example 37 | 159 | 152 | >15 |

EXAMPLE 38

The injection molded composition of Example 37 were further evaluated according to the tests for the specimens of Examples 22 and 23. Comparative results are set forth in Table III.

TABLE III

| Property | LEXAN (Polycarbonate) | Composition |
|---|---|---|
| Tensile Modulus, psi | 345,000 | 370,000 |
| Tensile Strength, psi | 9,000 | 9,100 |
| Yield Elongation, % | 10 | 7 |
| Elongation at Break, % | 110 | 46 |
| Flexural Modulus, psi | 340,000 | 396,000 |
| Flexural Strength, psi | 13,500 | 15,900 |
| HDT, °F. | 270 | 305 |
| Notched Izod, Ft-lbs/in | 12 | 12 |
| Gardner Impact, in-lbs | >320 | >320 |

EXAMPLE 39

A physical mixture of 33.3 percent by weight of dry polycarbonate having a 1:1 mole ratio of sulfone to bisphenol, 33.3 percent by weight Lexan polycarbonate, and 33.3 percent by weight Kodar A-150 polyester are extruder blended, injection molded, and tested for properties substantially as described in Example 22. The results are presented below:

HDT, °C.: 117
Flex. Mod. psi: 342,000
Flex. Str., psi: 15,100

EXAMPLE 40

A physical mixture of 40 percent by weight of dry polycarbonate having a 1:1 mole ratio of sulfone to bisphenol and 60 percent by weight of polyester carbonate (manufactured by General Electric Company under the trademark Lexan 3250) are extruder blended, injection molded, and tested for properties substantially as described in Example 22. The results are presented in Table IV below.

EXAMPLE 41

A physical mixture of 40 percent by weight of dry polycarbonate having a 7:3 mole ratio of sulfone to bisphenol and 60 percent by weight of Lexan 3250 polyester-carbonate are extruder blended, injection molded, and tested for properties substantially as described in Example 22. The results are presented in Table IV below.

TABLE IV

| Property | Example 39 | Example 40 |
|---|---|---|
| Tg, °C. | 190 | 195 |
| HDT, °C. | 161 | 176 |
| HDT, °F. | 322 | 349 |
| Notched Izod ft-lbs/in. | 3.0 | 3.2 |

EXAMPLE 42

The procedure of Example 1 is repeated substituting 40 percent by weight of polycarbonate having a 1:1 mole ratio of sulfone to bisphenol and 10 percent by weight of a polyarylate (sold by Union Carbide Corporation under the designation Ardel D-100). Comparative results after melt admixture at about 300° C. are as follows:

| Sulfone/Bisphenol Polycarbonate | Ardel D-100 Polyarylate | Composition |
|---|---|---|
| Tg = 210° C. | 192° C. | 207° C. |

EXAMPLE 43

The procedure of Example 1 is repeated substituting 70 percent by weight of polycarbonate having a 1:1 mole ratio of sulfone to bisphenol and 30 percent by weight of Ardel D-100 polyarylate. Comparative results after melt admixture at about 300° C. are as follows:

| Sulfone/Bisphenol Polycarbonate | Ardel D-100 Polyarylate | Composition |
|---|---|---|
| Tg = 210° C. | 192° C. | 203° C. |

EXAMPLE 44

The procedure of Example 1 is repeated substituting 50 percent by weight of polycarbonate having a 1:1 mole ratio of sulfone to bisphenol and 50 percent by weight of Ardel D-100 polyarylate. Comparative results after melt admixture at about 300° C. are as follows:

| Sulfone/Bisphenol Polycarbonate | Ardel D-100 Polyarylate | Composition |
|---|---|---|
| Tg = 210° C. | 192° C. | 197° C. |

EXAMPLE 45

The procedure of Example 1 is repeated substituting 30 percent by weight of polycarbonate having a 1:1 mole ratio of sulfone to bisphenol and 70 percent by weight of Ardel D-100 polyarylate. Comparative results after melt admixture at about 300° C. are as follows:

| Sulfone/Bisphenol Polycarbonate | Ardel D-100 Polyarylate | Composition |
|---|---|---|
| Tg = 210° C. | 192° C. | 196° C. |

EXAMPLE 46

The procedure of Example 1 is repeated substituting 10 percent by weight of polycarbonate having a 1:1 mole ratio of sulfone to bisphenol and 90 percent by weight of Ardel D-100 polyarylate. Comparative results after melt admixture at about 300° C. are as follows:

| Sulfone/Bisphenol Polycarbonate | Ardel D-100 Polyarylate | Composition |
|---|---|---|
| Tg = 210° C. | 192° C. | 193° C. |

EXAMPLE 47

A physical mixture of 50 percent by weight of dry polycarbonate having a 1:1 mole ratio of sulfone to bisphenol and 50 percent by weight of Ardel D-100 polyarylate are extruder blended, injection molded, and tested for properties substantially as described in Example 22. The results are as follows:

| Property | Composition |
|---|---|
| HDT, °C. | 167 |
| Flex Mod., psi | 347,000 |
| Flex Str., psi | 16,300 |

EXAMPLE 48

The procedure of Example 1 is repeated substituting 50 percent by weight of polycarbonate having a 1:1 mole ratio of sulfone to bisphenol and 50 percent by weight of polyetherimide (manufactured by General Electric Company under the trademark Ultem). Comparative results after melt admixture at about 330° C. are as follows:

| Sulfone/Bisphenol Polycarbonate | Ultem Polyetherimide | Composition |
|---|---|---|
| Tg 210° C. | 217° C. | 214° C. |

EXAMPLE 49

The procedure of Example 1 is repeated substituting 50 percent by weight of polycarbonate having a 8:2 mole ratio of sulfone to bisphenol and 50 percent by weight of Ultem polyetherimide. Comparative results after melt admixture at about 330° C. are as follows:

| Sulfone/Bisphenol Polycarbonate | Ultem Polyetherimide | Composition |
|---|---|---|
| Tg = 235° C. | 214° C. | 223° C. |

EXAMPLE 50

The procedure of Example 1 is repeated substituting 30 percent by weight of polycarbonate having a 8:2 mole ratio of sulfone to bisphenol and 70 percent by weight of Ultem polyetherimide. Comparative results after melt admixture at about 330° C. are as follows:

| Sulfone/Bisphenol Polycarbonate | Ultem Polyetherimide | Composition |
|---|---|---|
| Tg = 235° C. | 217° C. | 220° C. |

EXAMPLE 51

A physical mixture of 25 percent by weight of dry polycarbonate having a 1:1 mole ratio of sulfone to bisphenol and 75 percent by weight Udel polysulfone (P-1700, Union Carbide) are extruder blended, injection molded, and tested for properties substantially as described in Example 22. The results are presented in Table V below:

EXAMPLE 52

A physical mixture of 75 percent by weight of dry polycarbonate having a 1:1 mole ratio of sulfone to bisphenol and 25 percent by weight Victrex (I.C.I.) polyethersulfone are extruder blended, injection molded, and tested for properties substantially as described in Example 22. The results are presented in Table V below:

EXAMPLE 53

A physical mixture of 30 percent by weight of dry polycarbonate having a 1:1 mole ratio of sulfone to bisphenol and 70 percent by weight phenoxy resin are extruder blended, injection molded, and tested for properties substantially as described in Example 22. The results are presented in Table V below:

TABLE V

| EXAMPLE | FLEX. MOD., PSI | FLEX. STR., PSI |
|---|---|---|
| 51 | 388,000 | 17,000 |
| 52 | 375,000 | 18,000 |
| 53 | 389,000 | 15,800 |

EXAMPLE 54

A physical mixture of 60 percent by weight of dry polycarbonate having a 1:1 mole ratio of sulfone to bisphenol, 30 percent by weight poly(ethylene terephthalate), and 10 percent by weight of an acrylate based polymer called KM 330 (sold by Rohn & Haas) are extruder blended, injection molded, and tested for properties substantially as described in Example 22. The results are presented below:
HDT, °C: 122
Flex. mod., psi: 327,000
Flex. str., psi: 14,700
Tensile. mod., psi: 295,000
Tensile, str., psi: 8,800
Notched Izod. ft-lbs/in: 3.8

EXAMPLE 55

A physical mixture of 50 percent by weight of dry polycarbonate having a 1:1 mole ratio of sulfone to bisphenol, 25 percent by weight of poly(ethylene terephthalate), and a copolyether ester block copolymer (sold under the trade name Hytrel 5555 by E. I. du Pont de Nemours) are extruder blended, injection molded, and tested for properties substantially as described in Example 22. The results are presented below:
Flex mod., psi: 291,000
Flex strength, psi 14,250

EXAMPLE 56

A physical mixture of 50 percent by weight of dry polycarbonate having a 1:1 mole ratio of sulfone to bisphenol, 40 percent by weight poly(butylene terephthalate), and 10 percent by weight of an acrylate based polymer called KM 330 (sold by Rohm & Haas) are extruder blended, injection molded, and tested for properties substantially as described in Example 22. The results are presented below:
Flex. mod., psi: 328,000
Flex. str., psi: 13,300
Notched Izod ft-lbs/in: 11

Polymer Synthesis

The dixylenol sulfone/bisphenol A (DXS/BPA) described in the foregoing examples were prepared employing interfacial polymerization, in which a rapidly stirred two phase mixture of aqueous caustic, polymer solvent, bisphenols, a phase transfer catalyst, and monofunctional chain terminators is phosgenated. The growing polymer dissolves in polymer solvent, unreacted bisphenols dissolve in the aqueous caustic phase and the polymer forms at the interface. The polymer is isolated by precipitation in methanol and dried. The applicable technology of the synthesis of polycarbonates is described in "Chemistry and Physics of Polycarbonates" by H. Schnell (Interscience, 1964)

Preferred blends are admixtures of a polycarbonate resin including units derived from a first dihydric phenol, which is a bis(hydroxyaryl)sulfone and a second dehydric phenol, and a thermoplastic which is the resin product of a condensation polymerization reaction.

All of the foregoing patents and/or publications are incorporated herein by reference. Obviously, other modifications and variations of the present invention are possible in the light of the above teachings. It is, therefore, to be understood that changes may be made in the particular embodiments of the invention described which are within the full intended scope of the invention as defined by the appended claims.

We claim:
1. A thermoplastic resin composition comprising:
(a) a mixed polycarbonate consisting of units derived from a first dihydric phenol, which is a bis(hydroxyaryl)sulfone, and a second dihydric phenol, said first and second dihydric phenols being in a mole ratio of 1:5 to 7:3; and

(b) a thermoplastic condensation polymer comprising an aromatic polycarbonate, said composition having been admixed to produce a compatible composition.

2. The composition of claim 1, wherein the mixed polycarbonate comprises from about 1 to about 99 percent by weight of total resin weight.

3. The composition of claim 2, wherein the mixed polycarbonate comprises from about 10 to about 90 percent by weight of total resin weight.

4. A thermoplastic resin composition comprising:
   (a) from about 20 to about 80 percent by weight of a mixed polycarbonate consisting of units derived from a first dihydric phenol, which is a bis(hydroxyaryl)sulfone, and a second dihydric phenol, said first and second dihydric phenols being in a mole ratio of 1:5 to 7:3; and
   (b) from 80 to about 20 percent by weight of a thermoplastic condensation polymer comprising an aromatic polycarbonate, said composition having been admixed to produce a compatible composition.

5. The composition of claim 2, wherein the thermoplastic condensation polymer comprises from about 99 to 1 percent by weight of the total resin weight.

6. The composition of claim 3, wherein the thermoplastic condensation polymer comprises from about 90 to about 10 percent by wight of total resin weight.

7. The composition of claim 4, wherein a thermoplastic condensation polymer comprises from about 80 to about 20 percent by weight of the total resin weight.

8. The composition of claim 1, wherein the mixed polycarbonate comprises units derived from bis(3,5-dimethyl-4-hydroxyphenyl)sulfone.

9. The composition of claim 8, wherein the mixed polycarbonate also comprises units derived from 2,2'-bis(4-hydroxyphenyl)propane.

10. The composition of claim 9, wherein the bis(3,5-dimethyl-4-hydroxyphenyl)sulfone and the 2,2'-bis(4-hydroxyphenyl)propane units are in a mole ratio of from about 1:99 to about 99:1.

11. The composition of claim 1, wherein the mixed polycarbonate comprises units of 2,2'-bis(4-hydroxyphenyl)propane.

12. The composition of claim 1, wherein the mixed polycarbonate consists of units derived from bis(3,5-dimethyl-4-hydroxyphenyl)sulfone.

13. A composition as defined in claim 1, wherein the thermoplastic condensation polymer also includes a polymer selected from the group consisting of a polyester, a copolyestercarbonate, a polyarylate, a poly(aryl ether), a copolyetherester block copolymer, a polyhydroxyether, and a polyimide.

14. A composition as defined in claim 13, which also includes a thermoplastic addition polymer resin.

15. A composition as defined in claim 14, wherein said thermoplastic addition polymer resin is selected from a styrene resin, an alkyl acrylate resin, a vinyl halide resin, or a mixture of any of the foregoing.

16. A composition as defined in claim 13, wherein the aromatic polycarbonate (b) is the reaction product of a dihydric phenol and a carbonate precursor.

17. A composition as defined in claim 16, wherein the dihydric phenol is bisphenol-A and the carbonate precursor is carbonyl chloride.

* * * * *